(12) United States Patent
Guo et al.

(10) Patent No.: US 9,009,688 B2
(45) Date of Patent: Apr. 14, 2015

(54) TYPE CHECKING FOR OBJECT-ORIENTED PROGRAMMING LANGUAGES

(75) Inventors: Peng Guo, Beijing (CN); Xiaohua Shi, Beijing (CN)

(73) Assignee: Intel Corporation, Santa Clara, CA (US)

( * ) Notice: Subject to any disclaimer, the term of this patent is extended or adjusted under 35 U.S.C. 154(b) by 815 days.

(21) Appl. No.: 10/583,648

(22) PCT Filed: Dec. 30, 2005

(86) PCT No.: PCT/CN2005/002403
§ 371 (c)(1),
(2), (4) Date: Jun. 20, 2006

(87) PCT Pub. No.: WO2007/076629
PCT Pub. Date: Jul. 12, 2007

(65) Prior Publication Data
US 2009/0150863 A1    Jun. 11, 2009

(51) Int. Cl.
*G06F 9/44* (2006.01)
*G06F 9/45* (2006.01)

(52) U.S. Cl.
CPC ...................................... *G06F 8/437* (2013.01)

(58) Field of Classification Search
None
See application file for complete search history.

(56) References Cited

U.S. PATENT DOCUMENTS

| | | | | |
|---|---|---|---|---|
| 4,788,637 | A * | 11/1988 | Tamaru | 709/221 |
| 5,847,953 | A | 12/1998 | Sojoodi et al. | |
| 5,930,807 | A * | 7/1999 | Ebrahim et al. | 1/1 |
| 5,978,581 | A | 11/1999 | Sadiq et al. | |
| 6,058,396 | A * | 5/2000 | Birze et al. | 1/1 |
| 6,064,816 | A * | 5/2000 | Parthasarathy et al. | 717/109 |
| 6,081,665 | A * | 6/2000 | Nilsen et al. | 717/116 |
| 6,138,269 | A * | 10/2000 | Ball et al. | 717/108 |
| 6,151,703 | A * | 11/2000 | Crelier | 717/136 |
| 6,212,608 | B1 * | 4/2001 | Bak | 711/152 |
| 6,289,506 | B1 * | 9/2001 | Kwong et al. | 717/148 |
| 6,317,872 | B1 * | 11/2001 | Gee et al. | 717/152 |
| 6,381,734 | B1 * | 4/2002 | Golde et al. | 717/165 |
| 6,453,463 | B1 * | 9/2002 | Chaudhry et al. | 717/127 |
| 6,484,188 | B1 * | 11/2002 | Kwong et al. | 1/1 |
| 6,510,437 | B1 * | 1/2003 | Bak et al. | 707/783 |
| 6,557,023 | B1 * | 4/2003 | Taivalsaari | 718/1 |
| 6,681,381 | B1 * | 1/2004 | Soepenberg et al. | 717/118 |

(Continued)

FOREIGN PATENT DOCUMENTS

| | | | | |
|---|---|---|---|---|
| CN | 1282914 A | | 2/2001 | |
| EP | 1310865 A2 * | | 5/2003 | ............... G06F 9/44 |

(Continued)

OTHER PUBLICATIONS

Alpern et al., Dynamic Type Checking in Jalapeno, Proceedings of the Java Virtual Machine Research and Technology Symposium, published 2001, pp. 1-11.*

(Continued)

*Primary Examiner* — Tuan Q. Dam
*Assistant Examiner* — Zheng Wei
(74) *Attorney, Agent, or Firm* — Blakely, Sokoloff, Taylor & Zafman LLP

(57) ABSTRACT

Type checking between an object class and a target class may comprise getting an object header from an object, and checking from the object header a result of a first time type checking between a class of the object and a target class specified by a hotspot in the first time type checking.

18 Claims, 4 Drawing Sheets

(56) References Cited

U.S. PATENT DOCUMENTS

| | | | |
|---|---|---|---|
| 6,694,507 B2 * | 2/2004 | Arnold et al. | 717/108 |
| 6,760,907 B2 * | 7/2004 | Shaylor | 717/158 |
| 6,865,730 B1 * | 3/2005 | Burke et al. | 717/116 |
| 6,886,159 B2 * | 4/2005 | Onodera | 717/165 |
| 6,912,542 B2 * | 6/2005 | Li | 1/1 |
| 6,948,156 B2 * | 9/2005 | Sokolov | 717/136 |
| 7,058,929 B2 * | 6/2006 | Charnell et al. | 717/135 |
| 7,080,354 B2 * | 7/2006 | Adl-Tabatabai et al. | 717/116 |
| 7,200,842 B1 * | 4/2007 | Susser et al. | 717/159 |
| 7,210,122 B2 * | 4/2007 | Shuf et al. | 717/116 |
| 7,266,813 B2 * | 9/2007 | Nistler et al. | 717/141 |
| 7,272,828 B2 * | 9/2007 | Wu et al. | 717/148 |
| 7,356,802 B2 * | 4/2008 | de Sutter et al. | 717/108 |
| 7,373,639 B2 * | 5/2008 | Halstead et al. | 717/140 |
| 7,831,640 B2 * | 11/2010 | Stephens et al. | 707/816 |
| 7,870,170 B2 * | 1/2011 | Achanta et al. | 707/816 |
| 8,495,427 B2 * | 7/2013 | Arnold et al. | 714/35 |
| 2002/0037006 A1 * | 3/2002 | Sampath et al. | 370/389 |
| 2002/0108107 A1 * | 8/2002 | Darnell et al. | 717/153 |
| 2003/0079201 A1 * | 4/2003 | Sokolov | 717/118 |
| 2004/0003380 A1 * | 1/2004 | Fedorov | 717/148 |
| 2004/0015918 A1 * | 1/2004 | Kawahito et al. | 717/151 |
| 2004/0103391 A1 * | 5/2004 | Wu et al. | 717/122 |
| 2004/0205701 A1 * | 10/2004 | Onodera | 717/108 |
| 2004/0205750 A1 * | 10/2004 | Neuenhofen | 718/1 |
| 2005/0071810 A1 * | 3/2005 | Sutter et al. | 717/116 |
| 2005/0071826 A1 * | 3/2005 | Nistler et al. | 717/145 |
| 2006/0212847 A1 * | 9/2006 | Tarditi et al. | 717/117 |
| 2006/0253503 A1 * | 11/2006 | Barrs et al. | 707/203 |
| 2006/0253845 A1 * | 11/2006 | Achanta et al. | 717/151 |
| 2007/0277021 A1 * | 11/2007 | O'Connor et al. | 712/208 |
| 2009/0031292 A1 * | 1/2009 | Fulton et al. | 717/151 |
| 2009/0064114 A1 * | 3/2009 | Bottomley et al. | 717/148 |
| 2012/0054725 A1 * | 3/2012 | Inglis et al. | 717/148 |

FOREIGN PATENT DOCUMENTS

| | | |
|---|---|---|
| EP | 1310865 | 4/2006 |
| WO | WO 0157656 A2 | 8/2001 |

OTHER PUBLICATIONS

Gosling et al., "The Java Language Specification", Second Edition, Sun Microsystems, Inc. 901 San Antonio Road, Mountain View, California 94303, USA. Published 2005.

PCT, International Search Report, Application No. PCT/CN2005/002403, mailed Nov. 11, 2006.

Michal Cierniak, Guei-Yuan Lueh, James M. Stichnoth. Practicing JUDO: Java Under Dynamic Optimizations. In Proceedings of the ACM SIGPLAN 2000 conference on Programming language design and implementation. ACM Press, Vancouver, British Columbia, Canada, 2000, 13-26.

Ellen Moyse, International Preliminary Report on Patentability, Patent Cooperation Treaty, Jul. 1, 2008, 4 pages, PCT/CN2005/002403, The International Bureau of WIPO, Geneva, Switzerland.

Weihua Zhao, Written Opinion of the International Searching Authority, Patent Cooperation Treaty, Nov. 2, 2006, 3 pages, PCT/CN2005/002403, The State Intellectual Property Office, Beijing, China.

* cited by examiner

TYPE CHECKING FOR OBJECT-ORIENTED PROGRAMMING LANGUAGES

CROSS-REFERENCE TO RELATED APPLICATION

This application is a National Phase application of, and claims priority to, International Application No. PCT/CN2005/002403, filed Dec. 30, 2005, entitled TYPE CHECKING FOR OBJECT-ORIENTED PROGRAMMING LANGUAGES.

BACKGROUND

Object-oriented programming languages may support inheritance, which may use an existing type to derive a new type. Derived types may inherit data and operations of supertype of the derived types; and they may overwrite existing operations or add new ones. Complex object-oriented programs may contain complex inheriting hierarchies. These hierarchies may often require that the program explicitly convert an object reference from one type to another type. This type of conversion may need run-time type checking that may be used to check whether the object is cast into an invalid target type. For most implementation of object-oriented programming languages, besides a memory to store fields of an object, each object may have an object header to provide basic services of object-oriented programming, such as class hierarchies with virtual methods, and other metadata that may be tapped into for different kinds of uses.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques to accelerate run-time type checking in Java virtual machine. The implementation of the techniques is not restricted in Java virtual machine; it may be used by any execution environments for similar purposes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
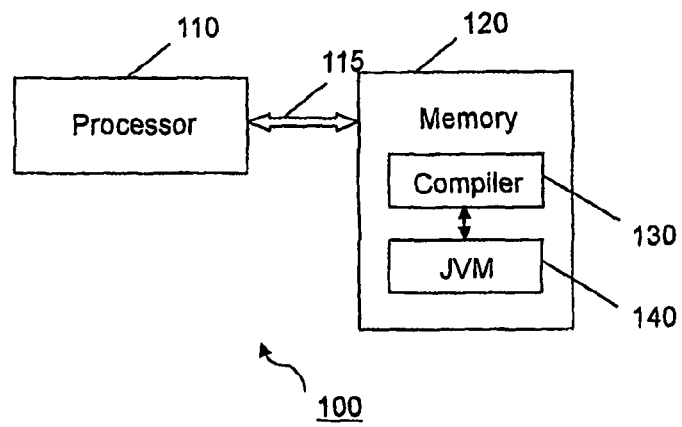
FIG. 1 illustrates an embodiment of a system that may implement type checking.

FIG. 1 illustrates an example system that may implement the methods of the present invention. Referring to FIG. 1, in one embodiment, system 100 may comprise a processor 110. Processor 110 may coupled with a memory 120 via a bus 115. Processor 110 may be any type of processor adapted to execute instructions from memory 120. For example, processor 110 may be a microprocessor, a digital signal processor, a microcontroller, or the like.

In one embodiment, processor 110 and memory 120 may be included on an integrated circuit board, and bus 115 may be implemented using traces on the circuit board. In another embodiment, processor 110 and memory 120 may be included within the same integrated circuit, and bus 115 may be implemented using interconnect within the integrated circuit.

As shown in FIG. 1, in one embodiment, processor 110 may execute a first compiler 130. The first compiler 130 may comprise any type of compiler adapted to output instructions for type checking. For example, the first compiler 130 may comprise a Java compiler that may output Java byte codes for runtime checking. In another embodiment, processor 110 may execute a Java Virtual Machine (JVM) 140. For example, JVM 140 may be implemented with a Just-In-Time (JIT) compiler. JVM 140 may be coupled with the first compiler 130 to translate the Java byte codes outputted from the first compiler 130 to architecture specific native codes. In yet another embodiment, the first compiler 130 and/or JVM 140 may be implemented with software that may be stored in memory 120. In one embodiment, processor 110 may perform operations according to the instructions from JVM 140, for example, a process as shown in FIG. 3 or 4.

Figure 3:
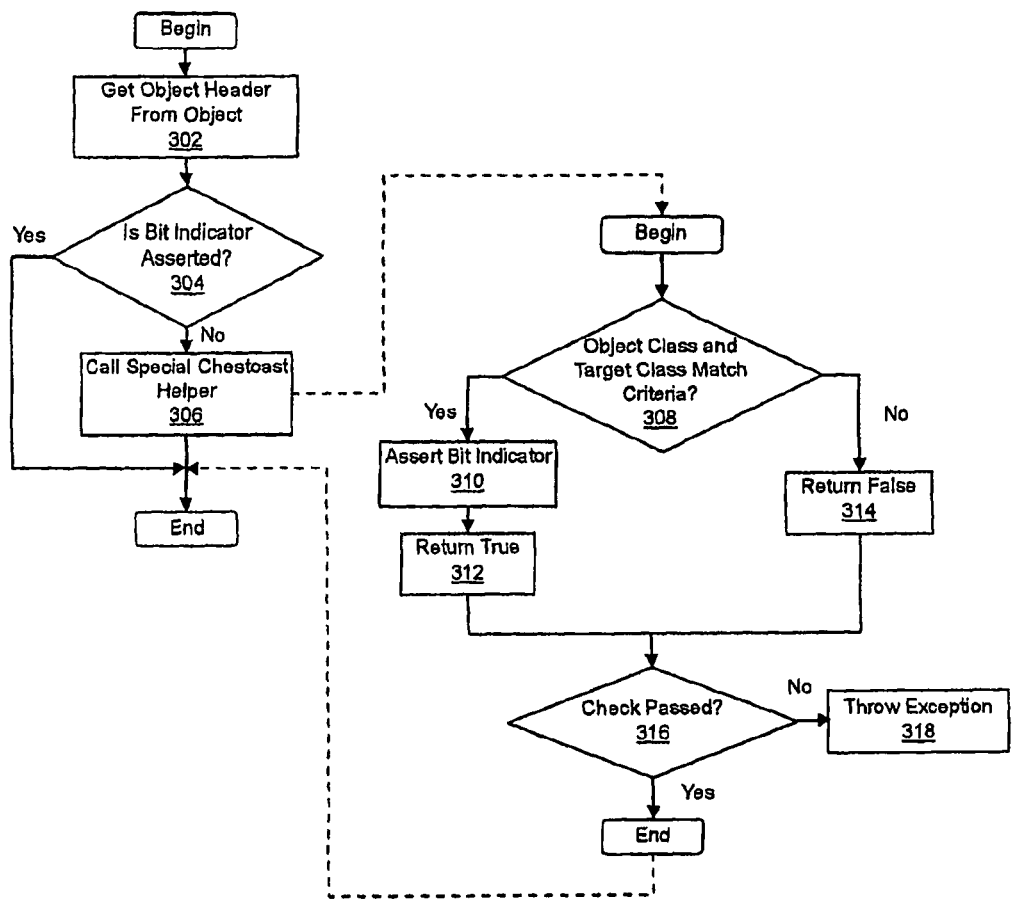
FIG. 3 illustrates an embodiment of a checkcast process that may be used in type checking for an object-oriented programming language.
Figure 4:
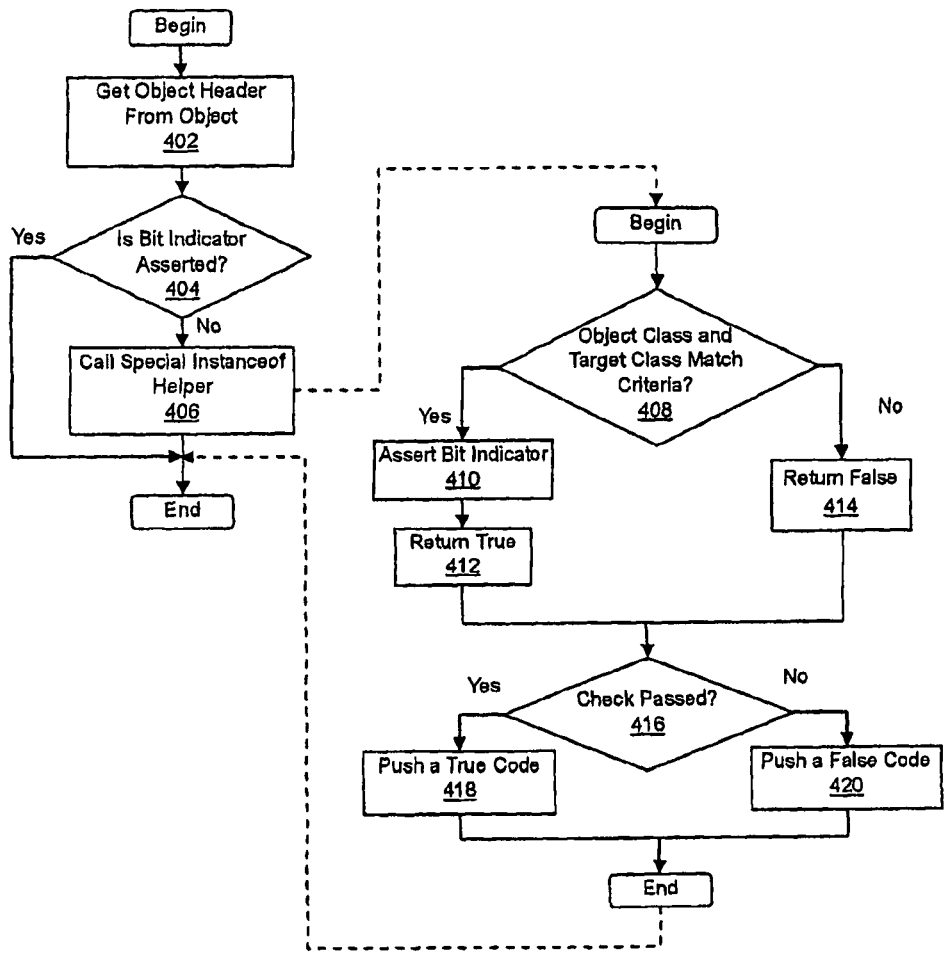
FIG. 4 illustrates an embodiment of an instanceof process that may be used in type checking for an object-oriented programming language.

FIG. 3 illustrates a flowchart showing an embodiment of a method that may be used in type checking for an object-oriented programming language. The following description may be focused on Java that is one of the object-oriented programming languages; however, other embodiments may be used for other dynamically compiled object-oriented programming languages such as, for example, C#, Python, LISP, etc. In the example of Java, it may have one or more, e.g., five, conversion contexts in which conversion expression may occur. For example, an example conversion from type S to type T may allow an expression of Type S to be treated at compiling time as if it had type T instead. In some cases, to achieve type safety during conversion, a corresponding action may be made at run time to check the validity of the conversion. For example, for an object, a conversion from type "class Object" to type "class Thread" may need a run-time check to see if the object is an instance of class Thread or one of its subclass. In one embodiment, Java Virtual Machine 140 may use one or more byte codes or instructions, e.g., checkcast and instanceof, for performing type checking on an object.

Figure 2:
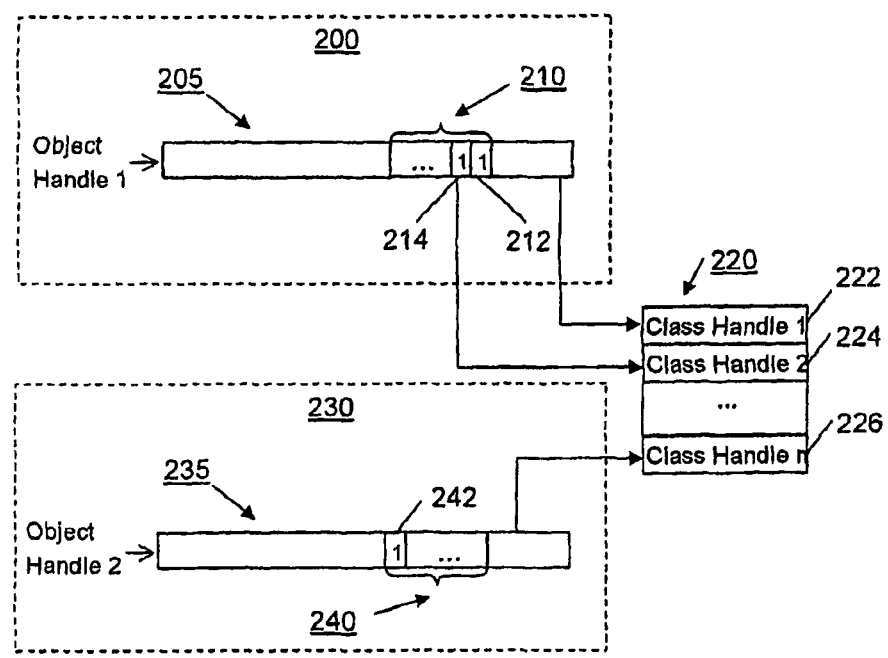
FIG. 2 illustrates an embodiment of a data structure that may be used in the present invention.

Referring to FIG. 3, the method may be used for a checkcast process. In block 302, processor 110 may obtain an object header. In one embodiment, processor 110 may get the object header from an object handle of an object 200 as shown in FIG. 2. Referring to FIG. 2, In one embodiment, object header 205 may comprise one or more bits that may represent the class of the object. Numerical reference 220 may represent a data structure. For example, data structure 220 may be implemented as table, array, list or the like. In one embodiment, data structure 220 may comprise a target class table. In one embodiment, data structure 220 may comprise one or more entries that each may comprise a target class handle associated with a hotspot. In another embodiment, the data structure 220 may be dedicated to one object, or shared by one or more objects inside JVM 140. For example, numerical reference 230 may refer to a second object. The second object 230 may comprise a second object header 235 that may be obtained from a second object handle 2; however, other embodiments may comprise a different number of objects.

For example, processor 110 may use dynamic profiling to find out one or more hotspots, e.g., during program running. For example, a hotspot may refer to a hot check point that may be a location in a program at which the type checking operation from objects to a given target class occurs one or more times, e.g., a lot of times, during program running. The processor 110 may deduce a target class from a type checking hotspot. In one embodiment, target class handle 222 may contain class identification of a first target class; target class handle 224 may contain class identification of a second target class; and target class handle 226 may contain class identification of the nth target class; however, other embodiments may identify target classes with different information. In one embodiment, the method of FIG. 3 may be used for type checking associated with a hotspot. In another embodiment, one or more type checking hotspots with the same target class may share the same bit indicator of an object header and thus the same target class entry.

In one embodiment, the first object header 205 may allocate one or more bits 210 that each may correspond to an entry in data structure 220. Similarly, the second object header 235 may allocate each of one or more bits 240 to a corresponding entry in data structure 220. For example, bit 212 may be allocated to the first entry 222; bit 214 may be assigned to the second entry 224; and bit 242 may be assigned to the nth entry 226; however, other embodiments may allocate a bit for an entry in a different order. In one embodiment, JVM 140 may assert the one or more bits 210 in the first object header 205 and/or one or more bits 240 in the second object header 235 as indicators that may each indicate whether a type checking associated with a corresponding entry is successful. For example, the one or more bit indicators 210 and/or 240 may have a first logic value (for example, "0") in their initial states. Processor 110 may assert a bit indicator 210 and/or 240 corresponding to an entry to a second logic value (for example, "1"), in response to determining that a type checking associated with the entry is successful.

In block 304, during performing a checkcast type checking for an object at a hotspot, processor 110 may check whether a bit indicator 210 in object header 205 of the object is asserted. For example, processor 110 may determine whether the bit indicator 210 that is allocated to a target class of the hotspot is asserted to a second logic value (for example, "1"). In response to the bit indicator 210 being asserted, processor 110 may determine that the type checking between the object class and the target class associated with the hotspot is successful and may terminate the type checking at the hotspot.

On the contrary, in block 306, JVM 140 may call a function that may be stored in memory 120 to perform a type checking for the object class, in response to determining that the bit indicator 210 is deasserted. For example, processor 110 may call the function, in response to determining that the bit indicator 210 has a first logic value or the bit indicator 210 is in its initial state. In one embodiment, the function may comprise a special checkcast helper, for example, with reference to blocks 308, 310, 312, 314, 316 and 318. In one embodiment, processor 110 may determine whether the object class of the current object and the target class match a predetermined criterion/condition.

In one embodiment, processor 110 may traverse the super classes of the class of the current object to see whether one of the super classes could be the same as the target class. For example, the type checking for the class of the current object is successful, in response to the processor 110 determining that one of the super classes is the same as the target class. In another embodiment, processor 110 may traverse a class hierarchy associated with the class of the current object to determine whether the target class is represented in the class hierarchy based on one or more predetermined criteria or conditions. For example, the processor 110 may determine that the type checking between the class of the current object and the target class is successful, in response to determining that the target class is represented in the class hierarchy.

In one embodiment, the class hierarchy may be implemented as an array of class references or the like that may be used to perform type checking in Java computing environments. In one embodiment, the class hierarchy may represent all the parent classes of Java classes in a hierarchical relationship. In another embodiment, an example of a predetermined criterion/condition is described as follows, wherein S=class of an object; T=target class:

I) If S is a nonarray class, then:
   i) If T is a class type, then S must be the same class as T, or a subclass of T.
   ii) If T is an interface type, then S must implement interface T.
II) If S is an interface type, then:
   i) If T is a class type, then T must be Object.
   ii) If T is an interface type, then T must be the same interface as S or a super interface of S.
III) If S is a class representing the array type SC☐, then:
   i) If T is a class type, then T must be Object.
   ii) If T is an array type TC☐, then one of the following must be true:
      a) TC and SC are the same primitive type.

b) TC and SC are reference types, and type SC can be cast to TC by recursive application of these criteria.

iii) If T is an interface type, T must be one of the interfaces implemented by arrays.

In block 310, processor 110 may assert a bit indicator 210 in the object header of the current object to indicate that the type checking between the object class and the target class is successful. For example, processor 110 may assert the bit indicator 210 to a second logic value. In one embodiment, the bit indicator 210 may correspond to an entry in data structure 220 that represents a target class, for example, class handle, associated with a hotspot. Further, in block 312, processor 110 may return the result indicating that the type checking between the object class and the target class is successful or the object class and the target class matches a predetermined criterion/condition. For example, processor 110 may return "True". In another embodiment, processor 110 may return a "True" result before asserting the bit indicator 210. Conversely, in response to determining that the class of the current object and the target class do not match the criterion/condition or the type checking fails, processor 110 may return a corresponding result, for example, "False" (block 314).

In block 316, processor 110 may determine whether the object has passed the type checking based upon the result returned in blocks 312 or 314. For example, in response to determining that the object has not passed the type checking based on a result "False" or a failure result, processor 110 may throw an exception (block 318). Conversely, in response to a pass result, e.g., "True", the type checking flow of FIG. 3 is ended. In one embodiment, processor 110 may continue other operations of the system 100.

FIG. 4 is a flowchart illustrating a method according to another embodiment of the present invention. Referring to FIG. 4, the process of FIG. 4 is similar to that of FIG. 3 except blocks 406, 418 and 420. In particular, in block 406, processor 110 may call a function that may be stored in memory 120, in response to determining that a bit indicator 210 associated with a target class of a type checking hotspot has not been asserted. For example, processor 110 may call a special instanceof helper. In another embodiment, in block 418, processor 110 may push a first code, e.g., a True code, on an operand stack of memory 120 in response to determining that the object has passed the type checking. Conversely, in block 420, processor 110 may push a second code, e.g., a False code, on the operand stack in response to determining that the object has not passed the type checking.

Similar with 80-20 rule, the hot or hottest check points (using, e.g., either checkcast or instanceof bytecode), that consume most runtime on type checking may occur at several points (thus for several target classes). And, type checkings at one or more or most of the hot or hottest check points may be successful, e.g., in most cases. In one embodiment, the method as shown in FIG. 3 or 4 may be used for every such check point. For example, the JVM 140 may use dynamic profiling to find out hot check points that are either checkcast or instanceof bytecode, during the processor executing the Java program, in which the type checking are made using conventional methods.

While the methods of FIGS. 3 and 4 are illustrated as a sequence of operations, the illustrated operations may be performed in a different order in other embodiments.

Figure 5:
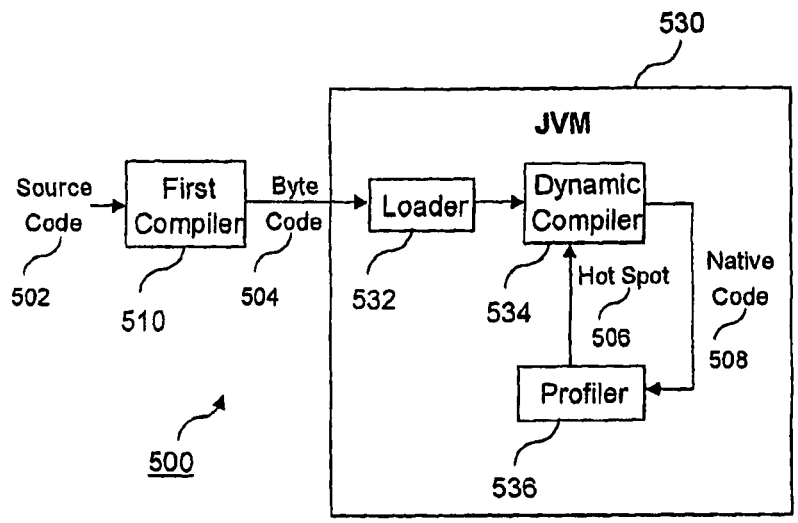
FIG. 5 is a block diagram illustrating an embodiment of a system that may dynamically generate type checking code in a Java run-time environment.

FIG. 5 is a block diagram illustrating an embodiment of a system 500 that may execute Java program in, e.g., system 100. In one embodiment, the system 500 may be a Java runtime system. The system 500 may contain a dynamic compiler 534 that may translate the Java program's bytecode into instructions of the processor 110 that may be executed directly on processor 110. In one embodiment, the dynamic compiler 534 may dynamically generate type checking code.

As shown in FIG. 5, system 500 may comprise a first compiler 510 that may compile Java source code 502 to Java byte code 504. In one embodiment, the first compiler 510 may be itself a computer program. Referring to FIG. 5, a loader 532 may load the byte codes 504 into JVM 530. A dynamic compiler 534 in JVM 530 may turn the byte code 504 loaded via loader 532 into native code 508 associated with the program. In one embodiment, the dynamic compiler 534 may comprise a "just-in-time" (JIT) compiler or the like. In another embodiment, JVM 530 may comprise an interpreter to interpret the byte codes 504. In another embodiment, JVM 530 may comprise a profiler 536 that may perform dynamic profiling during the program running to detect one or more hot check points, i.e., hotspots, that may occur at several points (thus for several type classes) in a program. Profiler 536 may return the detected hotspots 506 to dynamic compiler 534.

Figure 6:
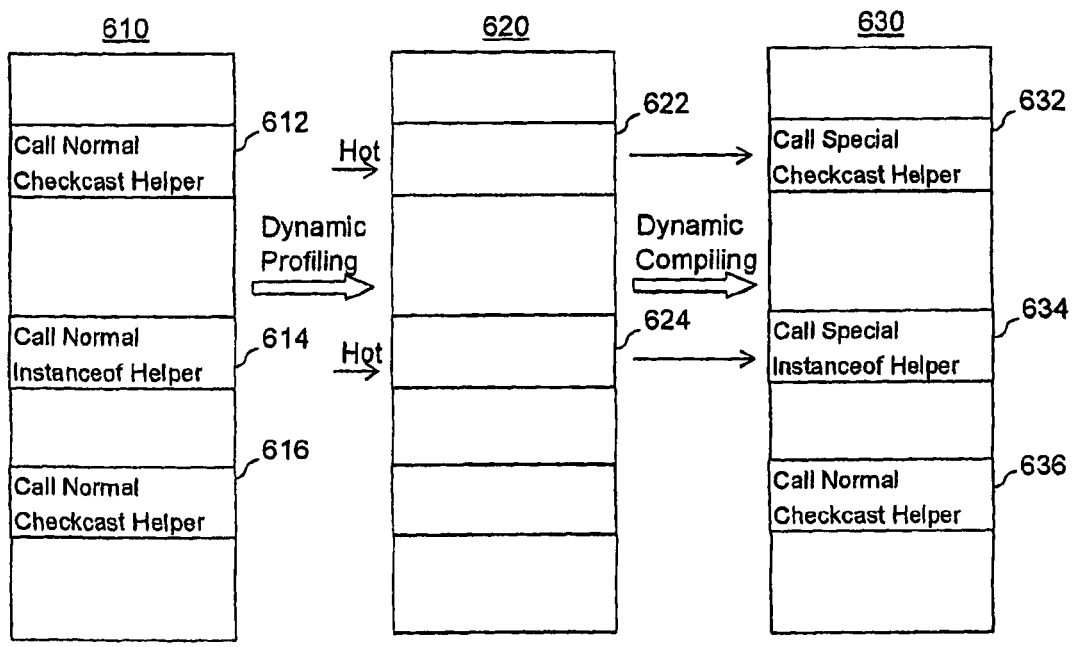
FIG. 6 is a schematic diagram of a type checking related process according to an embodiment of the present invention.

FIG. 6 is a schematic diagram of a type checking related process 600 that may be generated by JVM 530. In one embodiment, block 610 may refer to the native instructions of processor 110 translated from Java bytecodes 504. In one embodiment, dynamic compiler 534 may use normal methods to generate type checking code at the first time compilation. For example, dynamic compiler 534 may generate type checking code to call normal checkcast helpers 612 and 616 and a normal instanceof helper 614 for the type checking; however, other embodiments may use different functions for type checking in a different order. The normal type checking helper may get a class of an object and traverse a class hierarchy to check whether the object class and target class meets a criteria, which may be time consuming. During program running based on type checking code generated during the first time compilation, profiler 536 may perform dynamic profiling to detect type checking hotspots, which may trigger a second time compilation for these hotspots in dynamic compiler 534. Referring to FIG. 6, profiler 536 may determine a hotspot 622 of the checkcast helper 612 and a hotspot 624 of the instanceof helper 614.

In one embodiment, during the second time compilation, dynamic compiler 534 may deduce a target class for a hotspot of checkcast or instanceof helper. For example, dynamic compiler 534 may deduce a target class for hotspots 622 and 624 that relates to a normal checkcast helper and a normal instanceof helper, respectively. Dynamic compiler 534 may allocate an entry in data structure 220 to save the target class handle of the deduced target class and a corresponding bit indicator in an object for the entry. Referring to FIG. 2, in one embodiment, one bit indicator 210 may comprise a bit in object header 205 of an object 200 (the bit may be cleared by default). Dynamic compiler 534 may regenerate type checking code (for example, block 630) to check the bit indicator 210 and call a special helper for the hotspot. In one embodiment, for hotspot 622, dynamic compiler 534 may regenerate type checking code to check whether a bit indicator associated with hotspot 622 is asserted and call a special checkcast helper 632. For hotspot 624, dynamic compiler 534 may regenerate type checking code to check whether a bit indicator associated with hotspot 624 is asserted and call a special instanceof helper 632. In one embodiment, a special helper may be different from a normal helper in that the special helper may assert a bit indicator in an object header of an object in case of type checking success, for example, as shown in FIGS. 3 and 4. Comparing with traversing the class hierarchy, checking a bit indicator in an object header may reduce the runtime type checking overhead. In another embodiment, one or more type checking hotspots with the same target class may share the same bit indicator and the same target class entry.

In the following, an embodiment of a program that may need runtime type checking is described. For example, it may be assumed that there are two classes, Parent and Child. The program, e.g., Java program, may use the following statements to define the two classes.

```
class Parent {
    void foo( ) { }
}
class Child extends Parent {
    void foo( ) { }
    void bar( ) { }
}
```

In one embodiment, the program may use the following statement to create an instance of Child and assign to an reference (similar to a pointer) which has type Parent:
Parent ref=new Child( );
In another embodiment, the program may do type casting and call Child's bar as follows:
Child ref2=(Child) ref;
    ref2.bar( );
The first compiler 130 may output the bytecode checkcast, for example, before assigning the ref to ref2 to do runtime checking so as to make sure the casting is safe (e.g., the object is an instance of the target class or the target class's sub class).

In another embodiment, in the implementation 500, JVM 530 may be Implemented with dynamic compiler 534, such as a Just-In-Time (JIT) compiler. For example, the dynamic compiler 534 may translate the byte codes from the first compiler 510 to architecture native codes that may be recognized by processor 110. For checkcast & instanceof, dynamic compiler 534 may emit a call to a JVM 530's helper function, e.g., checkcast helper or instanceof helper. Processor 110 may use the function to do type checking and decide whether to throw an exception (for checkcast) or return the check status (for instanceof). An example of bytecodes and translated native instructions may be as follows:

```
checkcast Child
    ldr r0, [sp]           // get the object reference
    mov r1, #0x5a3200      // the target class
    bl 0x69d268            // call checkcast helper with object
reference and target class
```

In the example of a Java program, sometimes only several type checking may be hot. After dynamic compiler 534 completes the first time compilation, JVM 530 may use dynamic profiling to find hot places or hotspots, for example, in profiler 536. Another optimized procedure may be used for these hot places by saving the type checking results of the hot places into an object header 200. In one embodiment, dynamic compiler 534 may regenerate check codes for the hotspots. For example, if bit 0 in the object header is assigned for a hotspot, the following codes may be generated:

```
checkcast Child
    ldr r0, [sp]           // get object reference
    ldr r2, [r0]           // get object header (the header has the
information on object class, etc.)
    tst r2, #0x1           // check if bit 0 is asserted
    bne check_done         // if asserted, then this object has been
checked in this site, and the previous check is successful,
```

```
    mov r1, #0x5a3200      // skip the helper call
                           // the target class
    bl 0x69d268            // call check helper with object reference
and target class
    check_done:
    ...
```

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A method comprising:
    performing a first compilation on a set of one or more bytecodes to generate a first set of one or more type checking codes for an object,
    detecting a hotspot in the first set of one or more type checking codes for the object,
    in response to detecting the hotspot in the first set of one or more type checking codes, performing a second compilation on the first set of one or more type checking codes to generate a second set of one or more codes for the hotspot, and
    checking an indicator in an object header of the object based on the second set of one or more codes at the hotspot, wherein the indicator is to indicate a result of a type checking between a class of the object and a targeting class corresponding to the hotspot.

2. The method of claim 1 further comprising
    asserting the indicator in response to detecting a success of the type checking at the hotspot.

3. The method of claim 1 further comprising
    skipping the type checking between the object class and the target class at the hotspot, in response to determining that the indicator of the object header is asserted.

4. The method of claim 1 further comprising
    calling a special checkcast helper to perform the type checking between the object class and the target class at the hotspot, in response to determining that the indicator of the object header is not asserted.

5. The method of claim 1 further comprising
    detecting the hotspot in the first set of type checking codes by dynamic profiling.

6. A non-transitory machine readable storage medium comprising a plurality of instructions that in response to being executed result in a computing device
    performing a first compilation to translate a set of one or more bytecodes into a first set of one or more type checking codes for an object,
    detecting a hotspot in the first set of one or more type checking codes,
    performing a second compilation to translate the set of one or more bytecodes into a second set of one or more codes for the hotspot to check a bit indicator of an object header of the object, in response to detecting the hotspot, and
    performing a type checking between a class of the object and a target class corresponding to the hotspot based on the second set of one or more codes for the hotspot, in response to determining that the bit indicator is not asserted.

7. The non-transitory machine readable storage medium of claim 6, wherein the machine readable storage medium further comprising instructions that in response to being executed result in the computing device skipping the type checking at the hotspot between the object class and the target class based on the second set of one or more codes for the hotspot, in response to determining that the bit indicator is asserted to indicate a successful result of the type checking.

8. The non-transitory machine readable storage medium of claim 6, wherein the machine readable storage medium further comprising instructions that in response to being executed result in the computing device detecting at the hotspot whether the object class and the target class match a type checking criterion based on the second set of one or more codes, in response to the type checking between the object class and the target class.

9. The non-transitory machine readable storage medium of claim 6, wherein the machine readable storage medium further comprising instructions that in response to being executed result in the computing device asserting the bit indicator, in response to determining in the type checking that the object class and the target class match a type checking criterion.

10. The non-transitory machine readable storage medium of claim 6, wherein the machine readable storage medium further comprising instructions that in response to being executed result in the computing device in response to the type checking at the hotspot, returning a signal indicating whether the object class and the target class match a type checking criterion.

11. The non-transitory machine readable storage medium of claim 6, wherein the machine readable storage medium further comprising instructions that in response to being executed result in the computing device throwing an exception at the hotspot, in response to determining that the type checking for the hotspot is failed.

12. The non-transitory machine readable storage medium of claim 6, wherein the machine readable storage medium further comprising instructions that in response to being executed result in the computing device pushing a result code on a stack to indicate whether the type checking for the hotspot is successful.

13. A system comprising,
a processor,
a memory coupled to the processor, wherein the memory is to store a compiler to convert a set of one or more source codes associated with a type checking for an object into a set of one or more byte codes;

a loader coupled with the compiler to load the set of one or more byte codes;

a dynamic compiler coupled with the loader to receive the set of one or more byte codes from the loader, and to generate a first set of one or more native codes associated with the type checking based on the set of one or more byte codes; and a profiler coupled with the dynamic compiler to detect a hotspot in the the first set of one or more native codes, and to return the hotspot to the dynamic compiler, wherein in response to receiving the hotspot from the profiler, the dynamic compiler further to regenerate a second set of one or more native codes for the hotspot to check a result of a type checking between a class of the object and a target class corresponding to the hotspot based on an bit indicator in an object header of the object.

14. The system of claim 13, wherein the bit indicator has a first logic value to indicate a success of the result of the type checking between the class of the object and the target class.

15. The system of claim 13, wherein the dynamic compiler further to regenerate the second set of one or more native codes that performs the type checking between the object class and the target class at the hotspot in response to determining that the bit indicator is not asserted.

16. The system of claim 13, wherein the dynamic compiler further to regenerate the second set of one or more native codes that calls a function for the hotspot to skip the type checking between the object class and the target class, in response to determining that the bit indicator indicates a success of the type checking.

17. The system of claim 13, wherein the dynamic compiler further to regenerate the second set of one or more native codes that calls a type checking function for the hotspot to perform the type checking at the hotspot in response to determining that the bit indicator is not asserted and to assert the bit indicator to a first logical value in response to a success of the type checking.

18. The system of claim 13, wherein the dynamic compiler further to regenerate the second set of one or more native codes that calls a type checking function for the hotspot to traverse super classes of the class of the object to determine whether one of the super classes is the same as the target class in response to determining that the bit indicator is not asserted.

* * * * *